(12) United States Patent  (10) Patent No.: US 7,398,535 B2
Zhang  (45) Date of Patent: Jul. 8, 2008

(54) PORTABLE MEDIA PLAYER

(75) Inventor: Yong De Zhang, Guang Xi Province (CN)

(73) Assignee: Coby Electronics Corporation, Maspeth, NY (US)

( * ) Notice: Subject to any disclaimer, the term of this patent is extended or adjusted under 35 U.S.C. 154(b) by 711 days.

(21) Appl. No.: 11/009,396

(22) Filed: Dec. 10, 2004

(65) Prior Publication Data

US 2006/0130078 A1 Jun. 15, 2006

(51) Int. Cl.
 *G11B 5/33* (2006.01)
(52) U.S. Cl. ..................................................... 720/600
(58) Field of Classification Search .................. 720/600
 See application file for complete search history.

(56) References Cited

U.S. PATENT DOCUMENTS

| D409,608 S | 5/1999 | Masamitsu |
| 6,006,243 A | 12/1999 | Karidis |
| D466,490 S | 12/2002 | Zeitman |
| D469,419 S | 1/2003 | Ng |
| 6,522,368 B1 | 2/2003 | Tuccinardi et al. |
| D478,887 S | 8/2003 | Jerome |
| D521,964 S | 5/2006 | Zhang et al. |
| D532,400 S | 11/2006 | Zhang et al. |
| 7,277,272 B2 * | 10/2007 | Hsiung ....................... 361/679 |
| 2004/0005138 A1 * | 1/2004 | Yano et al. ..................... 386/46 |
| 2005/0025466 A1 * | 2/2005 | Yen et al. ..................... 386/125 |

OTHER PUBLICATIONS

Microtek Fun View S350—http://www.microtekusa.com/funview.html, Dec. 3, 2004, 3 pgs.

* cited by examiner

*Primary Examiner*—Joseph Feild
*Assistant Examiner*—Mark Blouin
(74) *Attorney, Agent, or Firm*—Thelen Reid et al.

(57) ABSTRACT

The present invention provides a portable media player, such as a portable DVD player. The portable media player has a clamshell type design, including a base portion and an openable cover portion. The openable cover portion includes a display screen, such as an LCD display screen. The player may include a single-hinge stand attached to an outer surface of the base portion so that DVDs may be viewed with the player positioned to stand upright or partially upright. The player may alternatively or additionally include an optionally attachable dual hinge stand having a base including a battery.

16 Claims, 16 Drawing Sheets

300

400

600

700

800

1200

1300

1500

PORTABLE MEDIA PLAYER

RELATED APPLICATIONS

This application is related to U.S. Design Patent Application No. 29/211,193 filed on Aug. 12, 2004 and U.S. Design Patent Application No. 29/210,419 filed on Jul. 30, 2004, both of which applications are hereby incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to media players, and in particular to a portable media player.

Portable media players, including devices providing audio and video output and including a screen or monitor, such as portable DVD players, televisions, players of digital media stored on a computer, etc., are becoming much more popular. For example, advances in technology have led to the availability, at a reasonable cost, of compact or portable audio and visual media players with small screens or monitors, such as an LCD screens.

Increasingly, people on the go want the ability, for example, to watch and listen to movies or music videos in a variety of environments and situations including, for example, at home, outdoors, or in a car, train or airplane. However, existing portable media players, such as existing DVD players, which may unfold open to reveal a screen, can be rather awkward, cumbersome, or bulky. Furthermore, existing portable media players may not be versatile and practical in a variety of different situations.

Portable or small devices including a video display are known in the art. For example, U.S. Pat. No. 6,522,368 to Tuccinardi et al. discusses a portable vehicle video system. The system includes a flat panel video display that can pivot flat against a vehicle ceiling when not in use. As a further example, U.S. Pat. No. 6,006,243 to Karidis discusses a foldable display screen notebook computer with a pivotable display screen.

There is a need for a portable media player, including a visual component, that is practical, versatile, compact, and fun to use.

SUMMARY OF THE INVENTION

In some embodiments, the present invention provides a portable media player, such as a portable DVD player. The portable media player has a clamshell type design, including a base portion and an openable cover portion. The openable cover portion includes a display screen, such as an LCD display screen. When the player is in an opened position, a DVD can be inserted onto the base portion so that, when the cover portion is closed, the DVD can be played and viewed on the display screen.

The player may include a single-hinge stand attached to an outer surface of the base portion so that DVDs may be viewed with the player positioned to stand upright or partially upright. The player may alternatively or additionally include an optionally attachable dual hinge stand having a base including a battery.

Players according to various embodiments may include an AC adapter, a battery which may be optionally attachable to the player, or both. Players may provide video output, video as well as audio output via a loudspeaker, attachable or wireless speakers, or headphones, and may provide other types of output as well.

In embodiments including a single-hinge stand, a user can use the player, for example, by holding the player in hand with the stand retracted, or the user can extend the stand and position the player on a surface for hands free viewing. The player may include a hook, strap, or other feature to allow hands free carrying, such as by hooking the player to a belt.

In embodiments including an optional attachable dual-hinge stand, which can include a stand with more than two hinges as well, a user can either use the player by holding it in hand, or can use a single-hinge stand, if included, or can attach the dual hinge stand. The dual hinge stand can provide a high degree of stability and positioning flexibility, and may or may not include a battery in its base, or may include an optionally removable battery in its base.

In some embodiments, whether the player includes, for example, no stand, a single-hinge stand, a dual-hinge stand, or both, a battery may be attachable to the player, for example, by being attachable to the outer surface of the base portion of the player. The player may also include an adapter with an extension cord for use, for example, by plugging into a power outlet. The player may also include a remote control for hands free operation. Furthermore, the player may have other functions, such as functioning as a radio, MP3 player and CD player, and includes all components necessary for such functions. The player may include a loudspeaker and may include a jack or jacks for external speakers, headphones, or other accessories or devices.

In one embodiment, the invention provides a portable media player including a clamshell style base portion having an outer surface and an inner surface. The portable media player further includes a clamshell style cover portion, having an outer surface and an inner surface, pivotally connected by a hinge to the base portion to allow rotational movement of the cover portion with respect to the base portion so as to allow the portable media player to be positioned in a closed clamshell position or an opened clamshell position. The portable media player is adapted to allow, in the opened clamshell position, insertion of a media storage device onto at least a portion of the inner surface of the base portion, and is adapted to allow, in the closed clamshell position, securing of the media storage device within the portable media player. At least a portion of the outer surface of the cover portion includes a display screen adapted to allow viewing of video while the portable media player is in the closed clamshell position.

In another embodiment, the invention provides a portable media player including a clamshell style base portion having an outer surface and an inner surface, and having an edge surface area and a non-edge surface area. The portable media player further includes a clamshell style cover portion, having an outer surface and an inner surface, pivotally connected by a first hinge to the base portion to allow rotational movement of the cover portion with respect to the base portion so as to allow the portable media player to be positioned in a closed clamshell position or an opened clamshell position. The portable media player is adapted to allow, in the opened clamshell position, insertion of a media storage device onto at least a portion of the inner surface of the base portion, and adapted to allow, in the closed clamshell position, securing of the media storage device within the portable media player. At least a portion of the outer surface of the cover portion includes a display screen adapted to allow viewing of video while the portable media player is in the closed clamshell position.

In this embodiment, the portable media player further includes a stand member, pivotally connected by a second hinge to the outer surface of the base portion, adapted to allow positioning of the portable media player on a first surface such that the portable media player is supported on the first surface by contact of at least a portion of the edge surface area of the base portion with the first surface and contact of at least a portion of the stand member with the first surface.

In another embodiment, the invention provides a portable media player including a clamshell style base portion having an outer surface and an inner surface; and having an edge surface area and a non-edge surface area. The portable media player further includes a clamshell style cover portion, having an outer surface and an inner surface, pivotally connected by a first hinge to the base portion to allow rotational movement of the cover portion with respect to the base portion so as to allow the portable media player to be positioned in a closed clamshell position or an opened clamshell position. The portable media player is adapted to allow, in the opened clamshell position, insertion of a media storage device onto at least a portion of the inner surface of the base portion, and adapted to allow, in the closed clamshell position, securing of the media storage device within the portable media player. At least a portion of the outer surface of the cover portion includes a display screen adapted to allow viewing of video while the portable media device is in the closed clamshell.

In this embodiment, the portable media player also includes a stand assembly adapted to be removably attachable to the outer surface of the base portion of the portable media player. The stand assembly includes a first portion; one or more leg members, the one or more leg members being stationary with respect to each other; and a stand base portion including a battery for actuation of the portable media player. The first portion is adapted to be removably attachable to the outer surface of the base portion of the portable media player. Furthermore, the first portion is pivotally attached by a second hinge to first ends of the one or more leg members to allow rotational movement of the leg members with respect to the outer surface of the base portion of the portable media player. The stand base portion is pivotally attached by a third hinge to second ends of the one or more leg members to allow rotational movement of the one or more leg members with respect to the stand base portion.

In another embodiment, the invention provides a portable media player. The portable media player includes a clamshell style base section having an outer surface and an inner surface, and having an edge surface area and a non-edge surface area. The portable media player further includes a clamshell style cover portion, having an outer surface and an inner surface, pivotally connected by a first hinge to the base portion to allow rotational movement of the cover portion with respect to the base portion so as to allow the portable media device to be positioned in a closed clamshell position or an opened clamshell position. The portable media player is adapted to allow, in the opened clamshell position, insertion of a media storage device onto at least a portion of the inner surface of the base portion, and adapted to allow, in the closed clamshell position, securing of the media storage device within the portable media player. At least a portion of the outer surface of the cover portion includes a display screen adapted to allow viewing of video while the portable media player is in a closed clamshell.

In this embodiment, the portable media player further includes a stand member, pivotally connected by a second hinge to the outer surface of the base portion, adapted to allow positioning of the portable media player on a first surface such that the portable media player is supported on the first surface by contact of at least a portion of the edge surface area of the base portion with the first surface and contact of at least a portion of the stand member with the first surface.

Furthermore, in this embodiment, the portable media player includes a stand assembly adapted to be removably attachable to the outer surface of the base portion of the portable media player. The stand assembly includes a first portion; one or more leg members, the one or more leg members being stationary with respect to each other; and a stand base portion including a battery for actuation of the portable media player. The first portion is adapted to be removably attachable to the outer surface of the base portion of the portable media player. Furthermore, the first portion is pivotally attached by a third hinge to first ends of the one or more leg members to allow rotational movement of the leg members with respect to the outer surface of the base portion of the portable media player. The stand base portion is pivotally attached by a fourth hinge to second ends of the one or more leg members to allow rotational movement of the one or more leg members with respect to the stand base portion.

In another embodiment, the invention provides a portable DVD player including a clamshell style base portion having an outer surface and an inner surface; and having an edge surface area and a non-edge surface area. The portable DVD player further includes a clamshell style cover portion, having an outer surface and an inner surface, pivotally connected by a first hinge to the base portion to allow rotational movement of the cover portion with respect to the base portion so as to allow the portable DVD player to be positioned in a closed clamshell position or an opened clamshell position. The portable DVD player is adapted to allow, in the opened clamshell position, insertion of a DVD onto at least a portion of the inner surface of the base portion, and adapted to allow, in the closed clamshell position, securing of the DVD within the portable DVD player. At least a portion of the outer surface of the cover portion includes a display screen adapted to allow viewing of video obtained from the DVD while the portable DVD player is in the closed clamshell position.

In this embodiment, the portable DVD player further includes a stand assembly adapted to be removably attachable to the outer surface of the base portion of the portable media player. The stand assembly includes a first portion; one or more leg members, the one or more leg members being stationary with respect to each other; and a stand base portion including a battery for actuation of the portable DVD player. The first portion is adapted to be removably attachable to the outer surface of the base portion of the portable DVD player. Furthermore, the first portion is pivotally attached by a second hinge to first ends of the one or more leg members to allow rotational movement of the leg members with respect to the outer surface of the base portion of the portable DVD player. The stand base portion is pivotally attached by a third hinge to second ends of the one or more leg members to allow rotational movement of the one or more leg members with respect to the stand base portion.

In another embodiment, the invention provides a portable DVD player including a clamshell style base portion having an outer surface and an inner surface, and having an edge surface area and a non-edge surface area. The portable DVD player further includes a clamshell style cover portion, having an outer surface and an inner surface, pivotally connected by a first hinge to the base portion to allow rotational movement of the cover portion with respect to the base portion so as to allow the portable DVD player to be positioned in a closed clamshell position or an opened clamshell position. The portable DVD player is adapted to allow, in the opened clamshell position, insertion of a DVD onto at least a portion of the inner surface of the base portion, and adapted to allow, in the closed clamshell position, securing of the DVD within the portable DVD player. At least a portion of the outer surface of the cover portion includes a display screen adapted to allow viewing of video obtained from the DVD while the portable DVD player is in the closed clamshell position.

In this embodiment, the portable DVD player further includes a stand member, pivotally connected by a second hinge to the outer surface of the base portion, adapted to allow positioning of the portable DVD player on a first surface such that the portable DVD player is supported on the first surface by contact of at least a portion of the edge surface area of the base portion with the first surface and contact of at least a portion of the stand member with the first surface.

Furthermore, in this embodiment, the portable DVD player includes a stand assembly adapted to be removably attachable to the outer surface of the base portion of the portable DVD player. The stand assembly includes a first portion; one or more leg members, the one or more leg members being stationary with respect to each other; and a stand base portion including a battery for actuation of the portable DVD player. The first portion is adapted to be removably attachable to the outer surface of the base portion of the portable DVD player. Furthermore, the first portion is pivotally attached by a third hinge to first ends of the one or more leg members to allow rotational movement of the leg members with respect to the outer surface of the base portion of the portable DVD player. The stand base portion is pivotally attached by a fourth hinge to second ends of the one or more leg members to allow rotational movement of the one or more leg members with respect to the stand base portion. The stand member can be positioned in a retracted position such that the stand member is positioned in a recessed area formed in the outer surface of the base portion of the portable DVD player, and wherein the stand assembly is attachable, while the stand member is in a retracted position, such that the stand base is positioned substantially flush with at least a portion of the outer surface of the base portion of the portable DVD player.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

While the player is described herein primarily with reference to a DVD player, it is to be understood that the invention contemplates portable media players other than, or in addition to, DVD players and media storage devices other than DVDs. For example, in some embodiments, the portable media player can play and display video by playing a digital or analog media storage device other than a DVD.

Herein, the terms "clamshell" and "clamshell style" include devices that include a base portion and a cover portion. Generally, the cover portion is hinged to the base position so that the cover portion can be moved rotationally about the hinge relative to the base portion.

Generally, the cover portion (or the base portion) of a clamshell style device can be positioned relative to the base portion so that the cover portion and the base portion substantially mate to together to form a substantially or largely round, flattened shape such as the shape of the players depicted in the figures herein. The device may include an assembly or system to lock or hold the device together in the closed clamshell position unless opened by a user.

Generally, the cover portion of a clamshell style device can also be positioned relative to the base portion so that the cover portion forms an angle with respect to the base portion at the hinge. The hinge is generally toward or at a portion of the outer edge area of the base portion and the cover portion.

Figure 1:
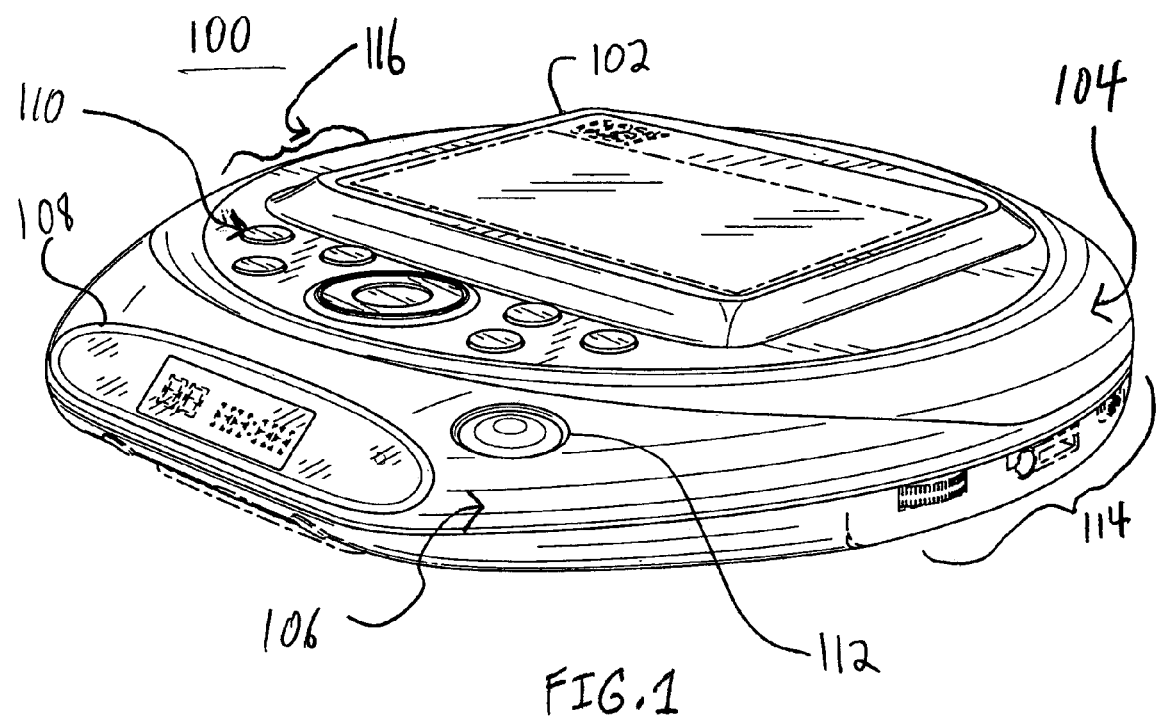
FIG. 1 depicts a perspective view of a portable DVD player according to one embodiment of the invention.

FIG. 1 depicts a perspective view of a clamshell style portable DVD player 100 according to one embodiment of the invention. The player 100 includes a base portion 106 and a cover portion 104.

The cover portion 104 includes a video display screen 102, such as, for example, an LCD display screen. In other embodiments, the display screen 102 can be another type of display screen, such as a display screen type used in notebook computers or small or portable televisions. The display screen 102 is used to provide a display, such as video, based on contents of an inserted media storage device, such as a DVD. The display screen may also be used to display other information, such as the time, elapsed time of a DVD, play status, including rewind, skip, and other information. In some embodiments, and if of appropriate dimensions, the display screen can be any of a variety of types of display screens of varying complexity, resolution, and sophistication as known in the art, including, among other types, a color or black and white display screen, an active matrix display screen, a flat panel display screen, a CRT screen, a TFT LCD color display screen, etc. In some embodiments, the display screen may be a touch-sensitive display screen useable with a stylus or other pointing device.

In some embodiments, for example, the display screen may be a NTSC format color TFT LCD display measuring 3.5 inches in diagonal measure of visible display, and may include on-screen control display. Resolution may be, for example, 336,960 pixels. A composite video output may be provided.

In some embodiments, other features may include, for example, an optical audio output, a 3.5 mm headphone jack, a DC 7.4V AC adapter, an AV cable and 110-240V UL adapter, a DC car charger, and stereo headphones, anti-skip circuitry, and a full function remote control.

As depicted, the display screen 102 is slightly raised with respect to the remainder of the cover portion 104, but, in other embodiments, the display screen 102 may also be even with, or set in relative to, the display screen 102. The display screen 102 may also include, underneath the visible surface and included as part of, or attached to, the cover portion 104, components, including electrical components, for functioning of the display screen.

The player 100 also has a second, smaller display screen 108 on a portion of the base portion 106, although, in some embodiments, the smaller screen may not be included. The smaller display screen 108 may be an LCD display screen or another type of display screen, such as described above with regard to the display screen 102 of FIG. 1.

As depicted, the display screens 102, 108 do not separate covers, but in some embodiments separate covers are provided, such as opaque covers, which covers may be openable and closable, for example.

The player 100 may also include one or more internal or external antennas or receivers for such things as radio and television reception.

The player also includes a number of controls 110, such as touch buttons, on the cover portion 104. These buttons may provide various functions and options associated, for example, with playing of a DVD or other media storage device, and may include navigational controls for such things as menu-driven displays. A button 112 is also included on the base portion 106 to open or allow opening of the cover portion 104 relative to the base portion 106.

A group 114 of various other controls, ports, outlets, etc. is included on the side or edge area of the base portion 106. The group 114 may include, among other things, a volume control, a port or ports for speakers and headphones, a port for an AC adapter, on on/off control, a control to switch between functions such as radio, DVD player, television, CD player, or other functions. A second group 116, or more than one other group, may also be included, for example, along the edge or side area of the base portion 106.

With respect to functions, in some embodiments, for example, the player may be DVD, CD, CD-R, CD-RW/MP3 and JPEG compatible, and may be capable of recording as well as playing audio and video. Viewing-related functions and features may also include multiple subtitles and viewing angles capability, slow and fast motion play, and zoom operation features.

In some embodiments, as depicted in later figures, the player 100 may include a stand or stands, such as a single hinge stand or a dual hinge stand or both, which stands, or some of them, may be optionally attachable (and detachable). In some embodiments, however, no stand or attachable stand is included. In some embodiments, a non-attachable or not necessarily attachable separate stand may be used. Furthermore, in some embodiments, a stand or with more than two hinges may be used.

In some embodiments, The player 100 may also include a battery (not shown), which may be permanent or optionally attachable, and which may attach to the outer portion of the base portion 106 of the player 100, or which may form all or a part of the outer portion of the base portion 106. In some embodiments, a battery may be included as part of a stand, such as a dual-hinge stand, as described herein particularly with reference to FIGS. 11-18. The battery may be a rechargeable battery, such as a rechargeable lithium ion battery.

Figure 2:
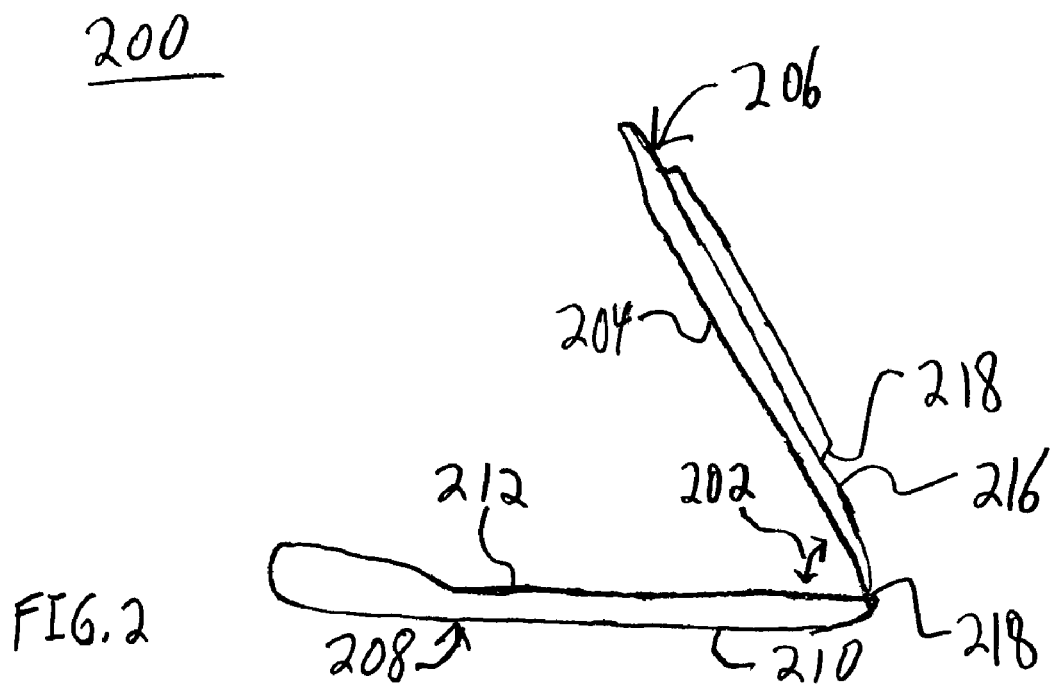
FIG. 2 depicts a simplified side view of a portable DVD player in an opened position, according to one embodiment of the invention.

FIG. 2 depicts a simplified side view of a portable DVD player 200 in an opened, or opened clamshell, position, according to one embodiment of the invention. The player 200 includes a base portion 208 and a cover portion 206. The base portion 208 includes an outer surface 210 and an inner surface 212, and the cover portion 206 includes an outer surface 216 and an inner surface 204. The outer surface 216 of the cover portion 206 includes a display screen 218, and may include one or more other display screens (not shown).

The player 200 also includes a hinge 218, which can include a multiple component hinge or a hinge assembly as known in the art, to allow rotational movement of the cover portion 206 relative to the base portion 208 from and through a closed, or closed clamshell, position (as depicted in FIG. 1) through to an opened, or opened clamshell, position as depicted in FIG. 2. In the opened position, the cover portion 206 forms an angle 202 with the base portion 218. In some embodiments, the maximum angle may be less than 90 degrees, but in other embodiments may be more than 90 degrees.

In the opened position, as depicted, a user may insert one or more media storage devices, such as a DVD, generally onto at least a portion of the inner surface 212 of the base portion 208, such that, when the player 200 is closed, the DVD is generally secured within the player 200, while being able to spin in order to be played.

Figure 3:
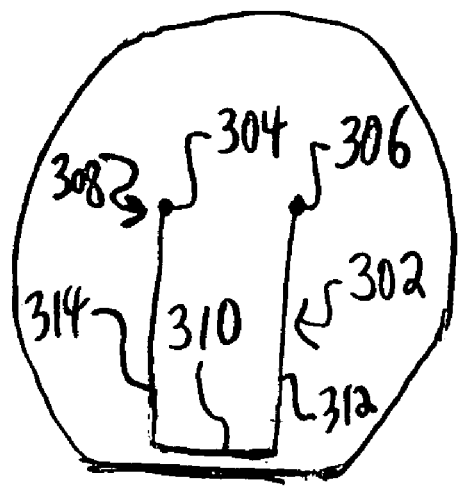
FIG. 3 depicts a simplified rear view of a portable DVD player according to one embodiment of the invention.

FIG. 3 depicts a simplified rear view of a portable DVD player 300 according to one embodiment of the invention. In the embodiment depicted, the player 300 includes a u-shaped stand member 302 or members, including a bottom portion 310 and two side portions 312, 314. In other embodiments, however, the stand member or members may be other than u-shaped.

Ends of the side portions 312, 314 of the stand member 302 are attached by a hinge 308, or hinge assembly, to a portion of the outer surface of the base portion of the player. The hinge 308 includes two pivot points 306, 308. The hinge 308 may be positioned in a retracted position such that it is substantially mated or flush with the outer surface of the base portion, or may be rotated to be in an extended position (as depicted in FIG. 4) to allow standing of the player.

In some embodiments, the outer surface of the base portion may include a recessed portion or grooves so that, when fully in the retracted position, the stand member 302 is not raised relative to the outer surface of the base portion. Additionally, the stand member 302 may lock or be held in place in the retracted or extended position, and the player 300 may include a button or other control for allowing the stand member 302 to be re-positionable.

Figure 4:
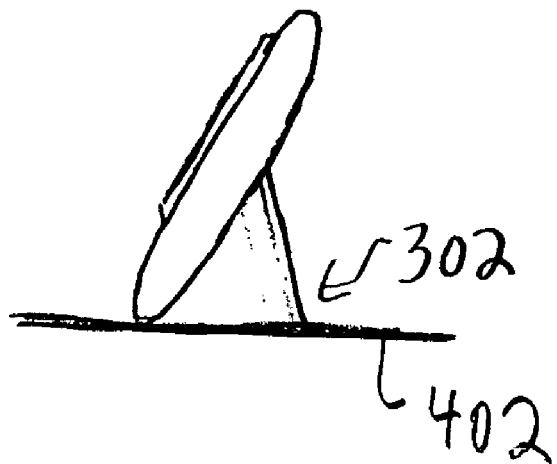
FIG. 4 depicts a simplified side view of a portable DVD player according to one embodiment of the invention.

FIG. 4 depicts a simplified side view of the portable DVD player 400, with the stand member 302 in the extended position. The player 400 is depicted supported on surface 402 by contact of at least a portion of the stand member 302, specifically, as depicted, the bottom portion 310, with the surface 402, and by contact of at least a portion of the outer surface of the edge area of the base portion of the player 300. It is to be noted that the portion of the base portion of the player 400 that contacts the surface 402 may include or be contact points or surfaces that may, for example, provide or help provide protection of the base portion or stable placement, such as two or more such contact points along an edge area of the base portion for contact with the surface 402. The stand member 310 may also have one or more contact points for contact with the surface 402.

In the supported position as depicted in FIG. 4, the player 400 can be viewed in a hands free fashion, and a user may use headphones or speakers, for example, for audio if audio is provided. Furthermore, a remote control may be included for hands free operation or control.

In some embodiments, the stand member 302 may be smaller or larger than depicted, and the hinge 308 may be located elsewhere on the outer surface of the base portion. For example, in some embodiments, the stand member may be substantially larger, such that the hinge is located toward the edge area of the player.

In some embodiments, the player includes a batter attached to the outer surface of the base portion, or forming, when attached, the outer portion of the base portion. If the stand member is large enough and appropriately shaped, the battery can be positioned inside the section or area formed, for example, by the u-shaped stand member. Alternatively, the stand member can be hinged or otherwise attached to the battery itself, or to the battery covering or an attachment to the battery.

Figure 5:
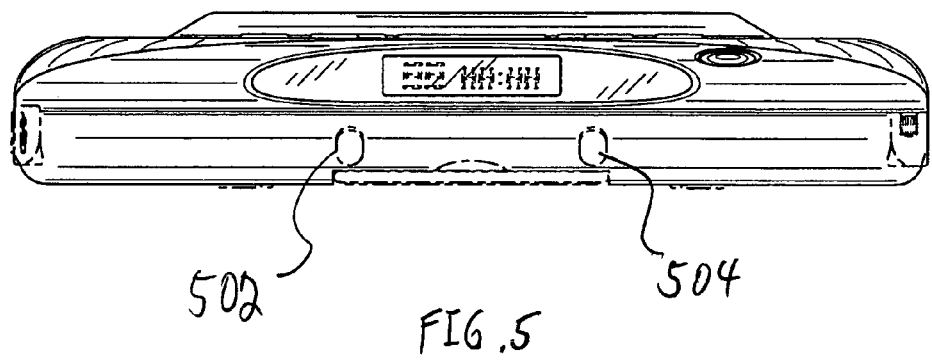
FIG. 5 depicts a front view of a portable DVD player according to one embodiment of the invention.

FIG. 5 depicts a front view of a portable DVD player 500 according to one embodiment of the invention. Two contact points 502, 504 can be seen. The contact points 502, 504 may be a slide-resistant or flexible material such as rubber, for example, and may be used in supporting the player 500 when a stand member, such as a single-hinge stand member, is used (as described with reference to FIGS. 3 and 4).

Figure 6:
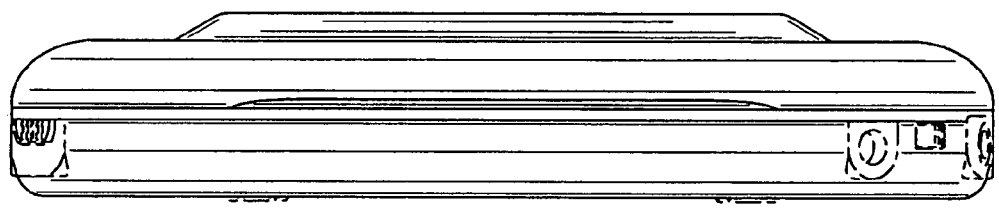
FIG. 6 depicts a back view of a portable DVD player according to one embodiment of the invention.

FIG. 6 depicts a back view of a portable DVD player 600 according to one embodiment of the invention.

Figure 7:
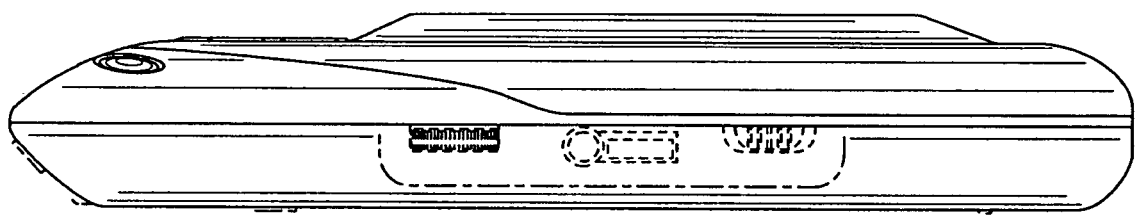
FIG. 7 depicts a side view of a portable DVD player according to one embodiment of the invention.

FIG. 7 depicts a side view of a portable DVD player 700 according to one embodiment of the invention.

Figure 8:
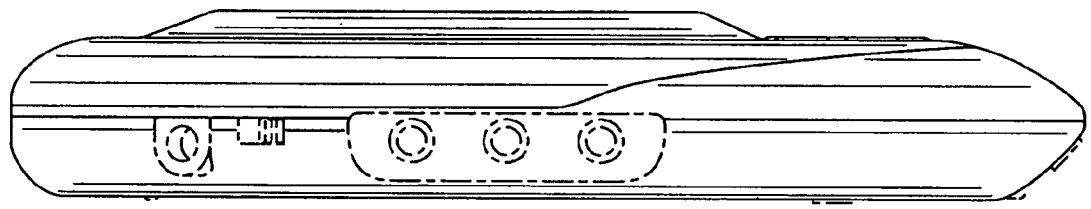
FIG. 8 depicts a side view of a portable DVD player according to one embodiment of the invention.

FIG. 8 depicts a side view of a portable DVD player 800 according to one embodiment of the invention. The side depicted is the opposite of the side depicted in FIG. 7.

Figure 9:
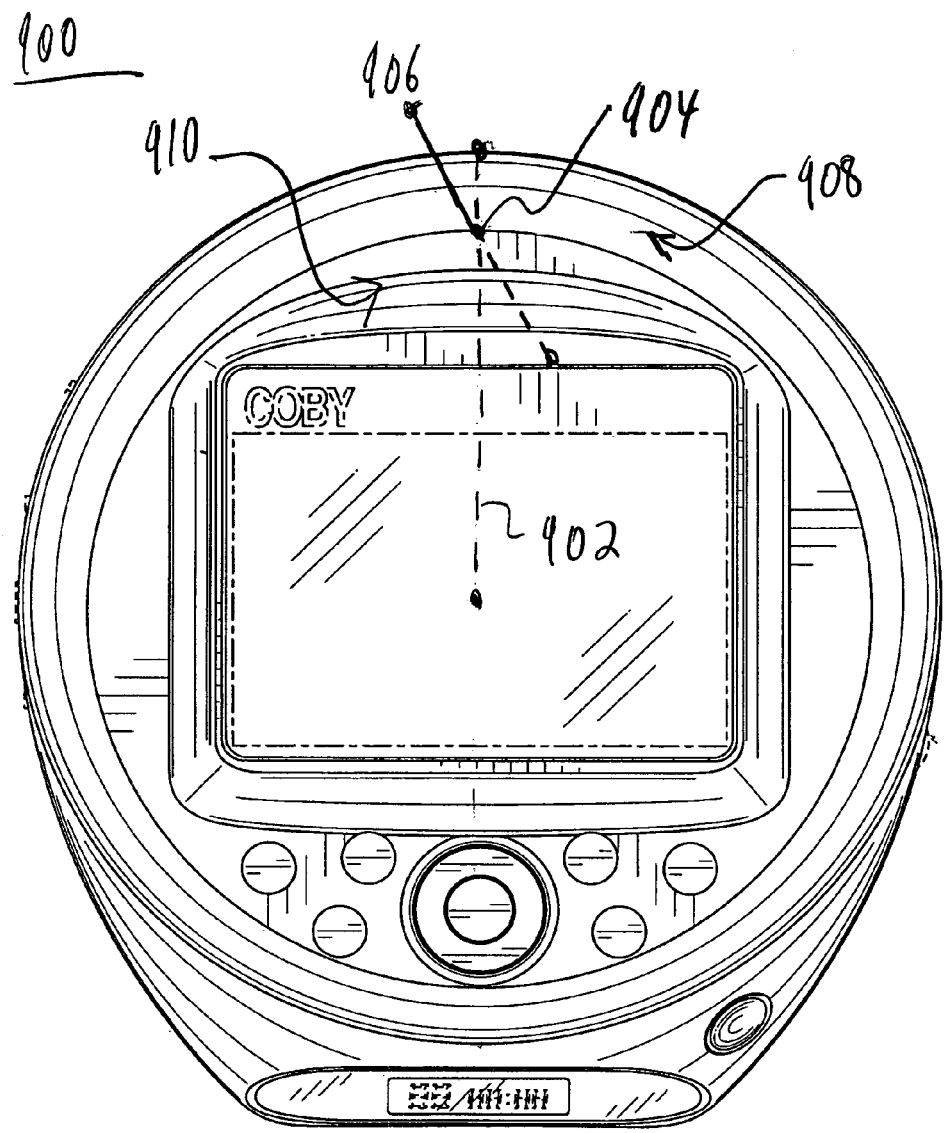
FIG. 9 depicts a top view of a portable DVD player according to one embodiment of the invention.

FIG. 9 depicts a top view of a portable DVD player 900 according to one embodiment of the invention. Although, as depicted, the player 900 is not exactly circular, a substantially radial first broken line 902 is depicted. While the broken line is not part of the player 900, point 904 is used to refer to a point on the outer surface of the cover portion of the player 900. A partially broken line 906 is used to represent a vertical axis passing through the horizontal axis formed by line 902. Generally, all area and points on the outer surface of the cover portion, which cover portion is seen from the view in FIG. 9, which area would fall radially beyond or outward of point 904, such as area 908, is considered to be part of the edge or side area of the cover portion. Conversely, all area and points that would fall radially before or inward of point 904, such as area 910, is considered to not be part of the edge or side area, or part of the non-edge area, of the cover portion.

Similarly, although the base portion of the player cannot be seen from this view, all area and points on the base portion that fall radially beyond point 906 are considered to be part of the edge or side area of the outer surface of the base portion. Conversely, all area and points of the outer surfaces of the cover portion and base portion which fall radially before point 906 are considered to not be part of the edge or side area, or part of the non-edge area, of the base portion.

Figure 10:
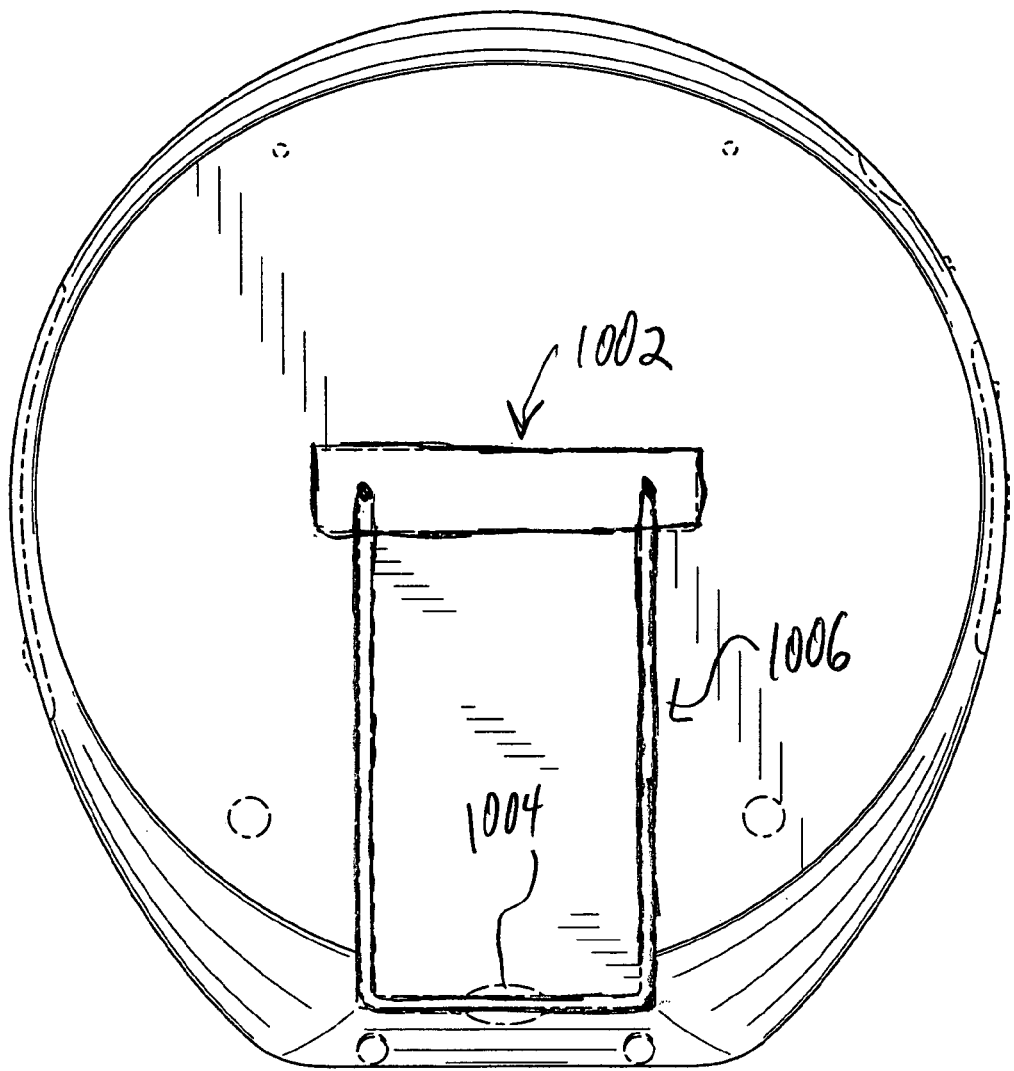
FIG. 10 depicts a bottom view of a portable DVD player according to one embodiment of the invention.

FIG. 10 depicts a bottom view of a portable DVD player 1000 according to one embodiment of the invention. A stand member 1006 is depicted, attached to the outer surface of the base portion of the player by a hinge 1002 or hinge assembly. A recessed area including finger grooves 1004 are included in the outer surface of the base portion to allow the stand member 1006 to be recessed therein, with the finger grooves 1004 being sized to allow manual re-positioning or extension of the stand member 1006.

Figure 11:
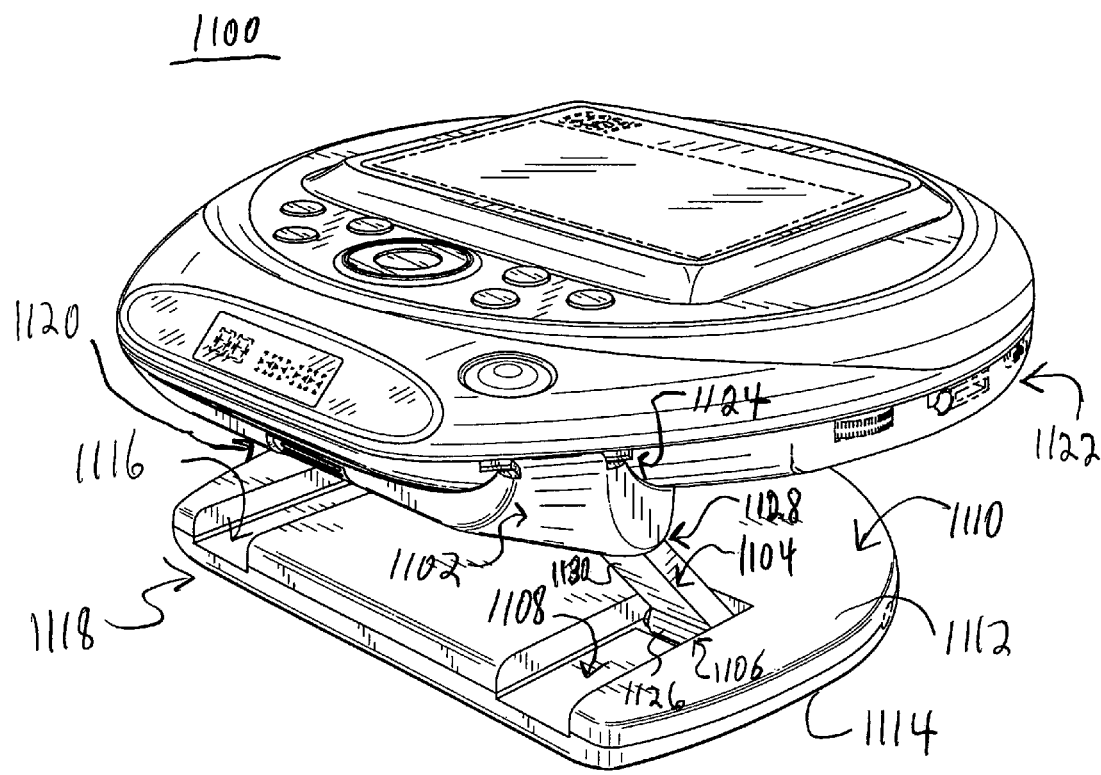
FIG. 11 depicts a perspective view of a portable DVD player according to one embodiment of the invention, including a dual-hinge stand.

FIG. 11 depicts a perspective view of a portable DVD player 1100 according to one embodiment of the invention, including a dual-hinge stand 1118. As depicted, the dual hinge stand 1118 may be attached to the player 1100 and may be considered to form a part thereof, or may be optionally detached from the player 1100. In the embodiment depicted, the player 1100 is operational and useable whether or not the stand 1118 is attached. If the stand 1118 is not attached, the player 1100 may be used with an AC adapter, or may include a battery, which battery may attach, or optionally be attachable to, for example, the outer surface of the base portion of the player 100 and may form a part thereof.

As depicted, the stand 1118 includes an attachment member 1102 for attachment to the outer surface of the base portion 1122 of the player 1100 as facilitated by attachment assembly 1124. The stand 1118 also includes two leg members 1104, 1120, including the first leg member 1104 and the second leg member 1120 which is hidden from view, and a stand base portion 1110. The stand 1118 can be attached and detached by a user, such as by sliding the stand 1118 into or out of position to engage or disengage the hold of the attachment assembly 1124.

The leg members 1104, 1120 are pivotally attached at one end to the attachment member 1102 by a hinge 1128 that is hidden from view, to allow rotational movement of the leg members 1104, 1120 relative to the attachment member 1102 and the player 1100. For example, leg member 1104 can be seen pivotally attached to the attachment member at its end 1130. The leg members 1104, 1120 are also pivotally attached at their other ends to the base portion 1110 by a hinge 1106 or hinge assembly, to allow rotational movement of the leg members 1104, 1120 relative to the stand base portion 1110. For example, leg member 1104 can be seen pivotally attached to the stand base portion at the leg member's end 1126. In the embodiment depicted, a user can position the stand 1100 as desired by movement permitted by the hinges 1128, 1106.

In the embodiment depicted, the hinges 1128, 1106 allow convenient manual movement by a user, yet resist movement sufficiently to retain the hinged components in a particular position relative to each other once manually adjusted by a user.

The stand base portion 1110, as depicted, includes a battery for actuation of the player 1100, the battery being included in the base portion 1118. The stand base portion 1110 also includes recesses 1108, 1116 for insertion of the leg members 1104, 1120 when the stand 1118 is in a fully retracted position (as depicted with reference to FIG. 12).

Figure 12:
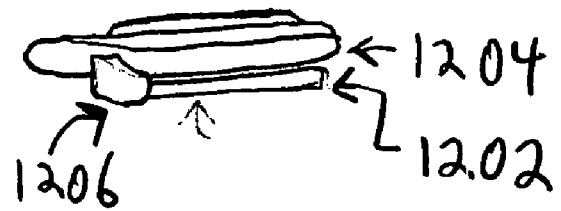
FIG. 12 depicts a simplified side view of a portable DVD player according to one embodiment of the invention, including a dual-hinge stand in a retracted position.

FIG. 12 depicts a simplified side view of a portable DVD player 1200 according to one embodiment of the invention, including a dual-hinge stand 1206 in a retracted position. In the retracted position, the stand base portion 1202 is flush or nearly flush against a portion of the outer surface of the base portion 1204 of the player 1200. In this position, one or more leg members, which are hidden from view, are recessed into recesses in the stand base portion 1202. This position may be useful is a user desires to use a battery in the stand 1206, but not to use the stand 1206 to stand the player.

Figure 13:
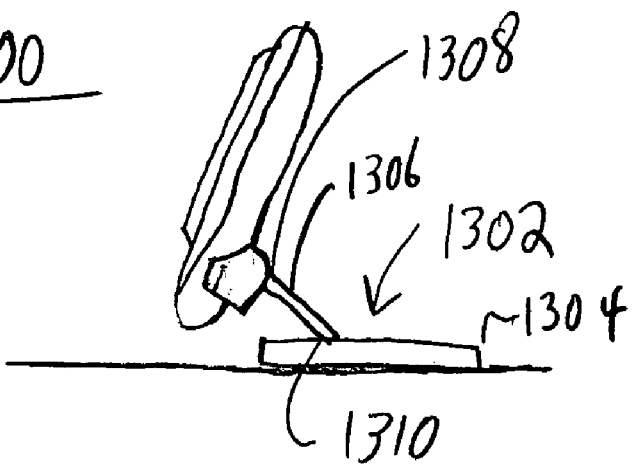
FIG. 13 depicts a simplified side view of a portable DVD player according to one embodiment of the invention, including a dual-hinge stand in an extended position.

FIG. 13 depicts a simplified side view of a portable DVD player 1300 according to one embodiment of the invention, including a dual-hinge stand 1302 in an extended position. Relative to the retracted position depicted in FIG. 12, the one or more leg members 1306 have been rotated at one end 1308 relative to the base portion of the player 1300, as well as having been rotated at the other end 1310 relative to the stand base 1304.

The dual-hinge design allows good available positioning variety. As depicted, the stand 1302 holds the player 1200 in a nearly upright position, with a slight upward tilt, which may be an ideal viewing position in many situations. In some embodiments, the weight of the stand base portion 1304, which may include a battery, helps stabilize and prevent tipping of the player 1300 in various positions. The position depicted in FIG. 13 is not meant to be the limit of the rotation afforded by the hinges, and many different stable positions are achievable.

Figure 14:
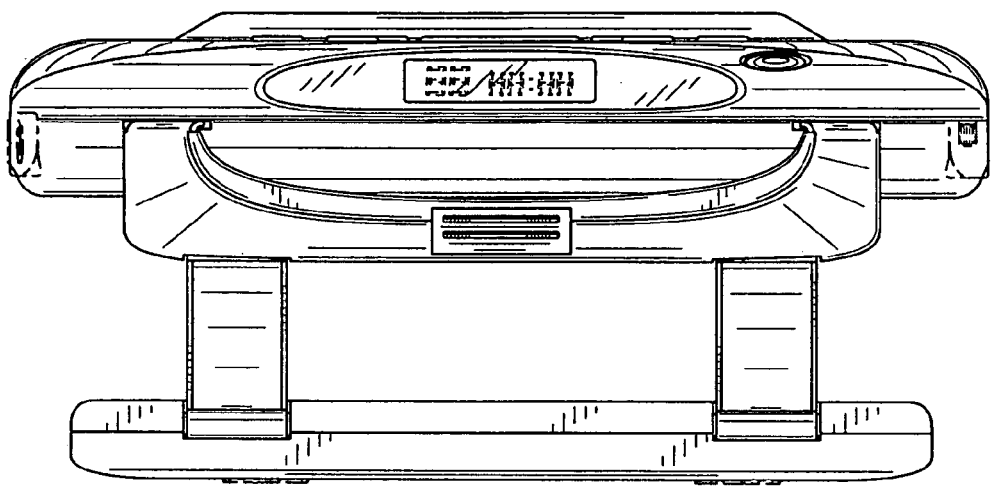
FIG. 14 depicts a front view of a portable DVD player according to one embodiment of the invention, including a dual-hinge stand.

FIG. 14 depicts a front view of a portable DVD player 1400 according to one embodiment of the invention, including a dual-hinge stand.

Figure 15:
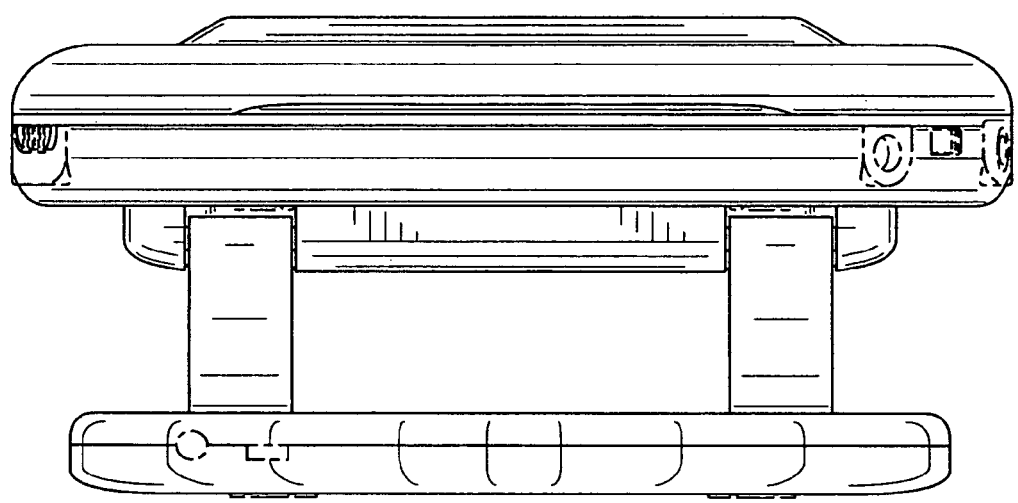
FIG. 15 depicts a back view of a portable DVD player according to one embodiment of the invention, including a dual-hinge stand.

FIG. 15 depicts a back view of a portable DVD player 1500 according to one embodiment of the invention, including a dual-hinge stand.

Figure 16:
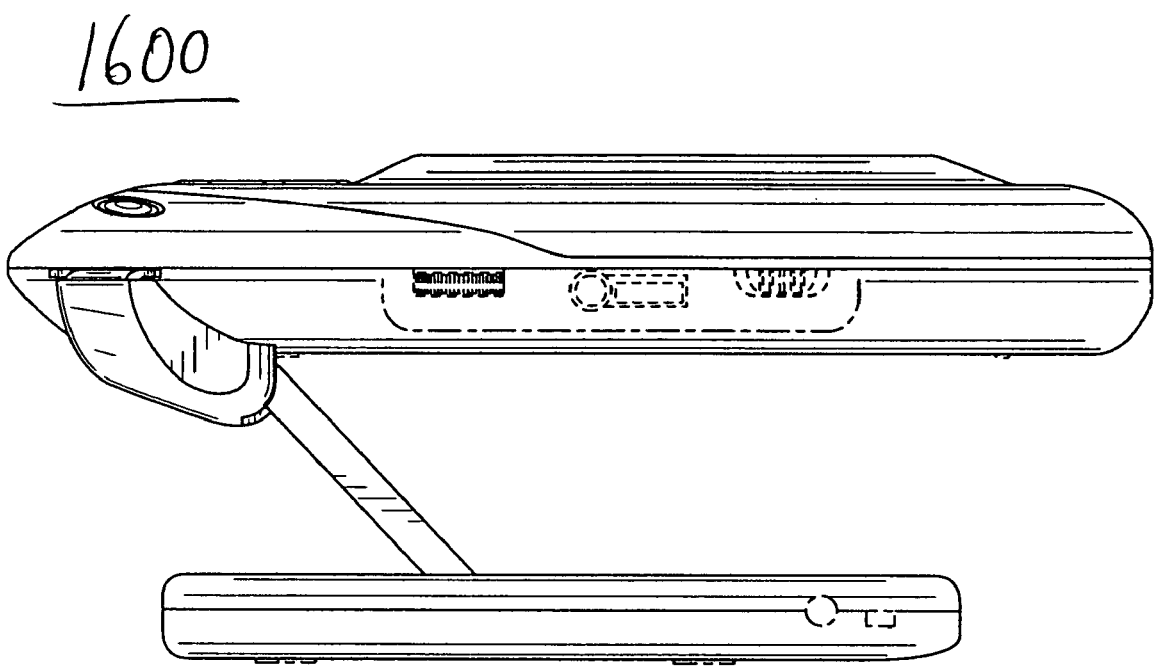
FIG. 16 depicts a side view of a portable DVD player according to one embodiment of the invention, including a dual-hinge stand.

FIG. 16 depicts a side view of a portable DVD player 1600 according to one embodiment of the invention, including a dual-hinge stand.

Figure 17:
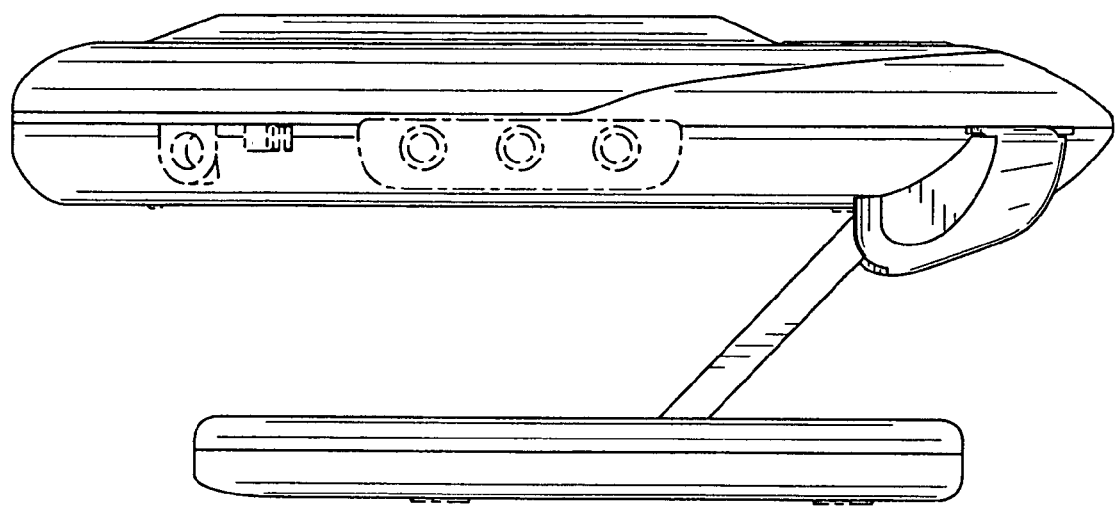
FIG. 17 depicts a side view of a portable DVD player according to one embodiment of the invention, including a dual-hinge stand.

FIG. 17 depicts a side view of a portable DVD player 1700 according to one embodiment of the invention, including a dual-hinge stand.

Figure 18:
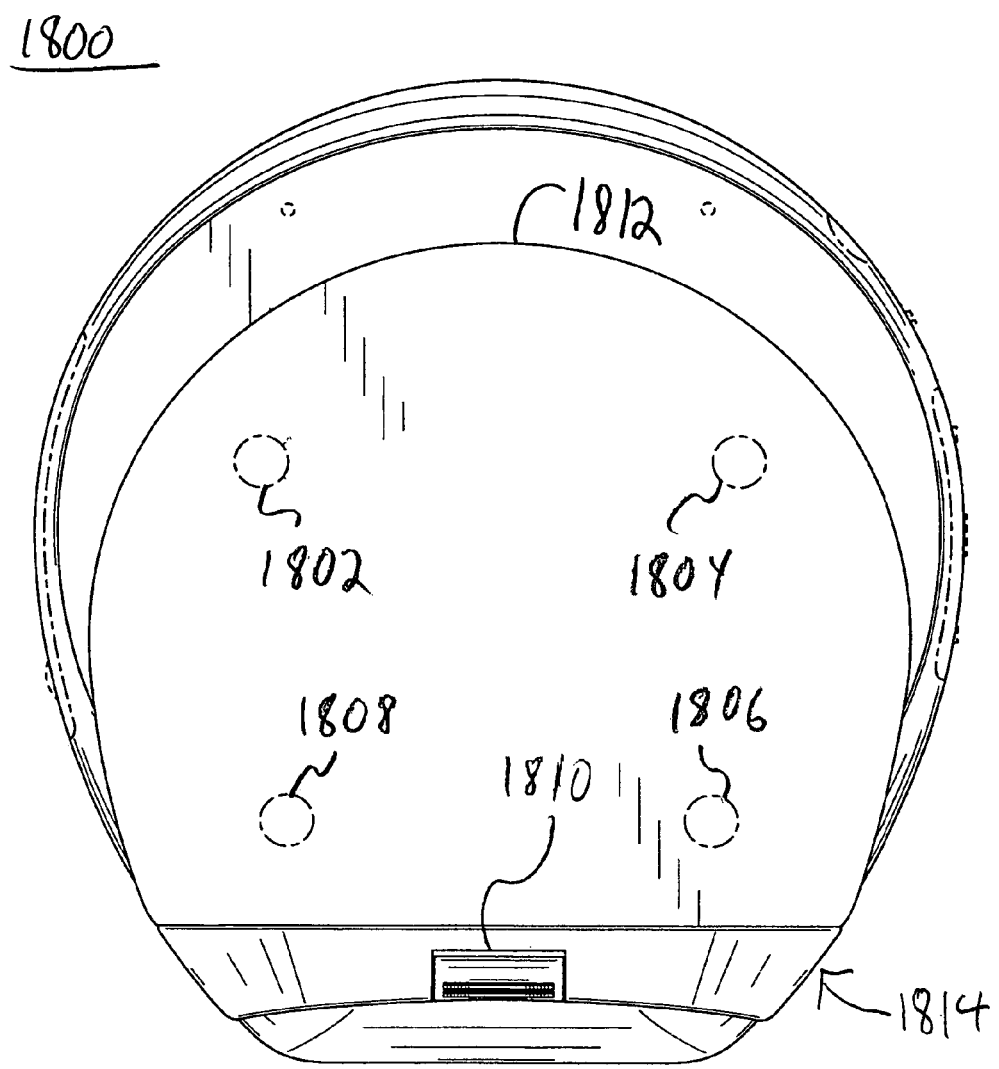
FIG. 18 depicts a bottom view of a portable DVD player according to one embodiment of the invention, including a dual-hinge stand.

FIG. 18 depicts a bottom view 1800 of a portable DVD player according to one embodiment of the invention, including a dual-hinge stand 1814. In the depicted embodiment, contact pieces, points or areas 1802, 1804, 1806, 1808 are included on the outer surface of the stand base portion 1802 to contact a surface on which it may be placed, helping provide, for example, stability or protection. The contact areas 1802, 1804, 1806, 1808 may also prevent the stand base portion 1802 from directly contacting the surface, which, in some embodiments, can both help protect the stand base portion 1802 and also slightly distance an included battery from the surface. A release button 1810 is also depicted, which can be depressed by a user to allow sliding off of the stand 1814 from a base portion of the player 1800.

The invention claimed is:

1. A portable media player comprising:
   a clamshell style base portion having an outer surface and an inner surface, and having an edge surface area and a non-edge surface area;
   a clamshell style cover portion, having an outer surface and an inner surface, pivotally connected by a first hinge to the base portion to allow rotational movement of the cover portion with respect to the base portion so as to allow the portable media player to be positioned in a closed clamshell position or an opened clamshell position;
      wherein the portable media player is adapted to allow, in the opened clamshell position, insertion of a media storage device onto at least a portion of the inner surface of the base portion, and adapted to allow, in the closed clamshell position, securing of the media storage device within the portable media player; and
      wherein at least a portion of the outer surface of the cover portion includes a display screen adapted to allow viewing of video while the portable media device is in the closed clamshell position; and
   a stand assembly adapted to be removably attachable to the outer surface of the base portion of the portable media player, the stand assembly comprising:
      a first portion;
      one or more leg members, the one or more leg members being stationary with respect to each other; and
      a stand base portion including a battery for actuation of the portable media player;
      wherein the first portion is adapted to be removably attachable to the outer surface of the base portion of the portable media player;
      wherein the first portion is pivotally attached by a second hinge to first ends of the one or more leg members to allow rotational movement of the leg members with respect to the outer surface of the base portion of the portable media player; and
      wherein the stand base portion is pivotally attached by a third hinge to second ends of the one or more leg members to allow rotational movement of the one or more leg members with respect to the stand base portion.

2. The portable media player of claim 1, wherein the one or more leg members consist of two leg members.

3. The portable media player of claim 2, wherein the portable media player comprises a DVD player and wherein the media storage device comprises a DVD.

4. The portable media player of claim 3, wherein the display screen is an LCD display screen.

5. The portable media player of claim 3, comprising a second display screen positioned on a portion of the edge surface area of the base portion of the portable media player.

6. The portable media player of claim 5, wherein the second display screen is an LCD screen.

7. The portable media player of claim 5, wherein the battery is a rechargeable lithium ion battery.

8. A portable media player comprising:
   a clamshell style base section having an outer surface and an inner surface, and having an edge surface area and a non-edge surface area;
   a clamshell style cover portion, having an outer surface and an inner surface, pivotally connected by a first hinge to the base portion to allow rotational movement of the cover portion with respect to the base portion so as to allow the portable media device to be positioned in a closed clamshell position or an opened clamshell position;

wherein the portable media player is adapted to allow, in the opened clamshell position, insertion of a media storage device onto at least a portion of the inner surface of the base portion, and adapted to allow, in the closed clamshell position, securing of the media storage device within the portable media player; and wherein at least a portion of the outer surface of the cover portion includes a display screen adapted to allow viewing of video while the portable media player is in the closed clamshell position;

a stand member, pivotally connected by a second hinge to the outer surface of the base portion, adapted to allow positioning of the portable media player on a first surface such that the portable media player is supported on the first surface by contact of at least a portion of the edge surface area of the base portion with the first surface and contact of at least a portion of the stand member with the first surface; and a stand assembly adapted to be removably attachable to the outer surface of the base portion of the portable media player, the stand assembly comprising:

a first portion;

one or more leg members, the one or more leg members being stationary with respect to each other; and a stand base portion including a battery for actuation of the portable media player;

wherein the first portion is adapted to be removably attachable to the outer surface of the base portion of the portable media player;

wherein the first portion is pivotally attached by a third hinge to first ends of the one or more leg members to allow rotational movement of the leg members with respect to the outer surface of the base portion of the portable media player; and wherein the stand base portion is pivotally attached by a fourth hinge to second ends of the one or more leg members to allow rotational movement of the one or more leg members with respect to the stand base portion.

9. The portable media player of claim 8, wherein the stand member can be positioned in a retracted position such that the stand member is positioned in a recessed area formed in the outer surface of the base portion of the portable media player, and wherein the stand assembly is attachable, while the stand member is in a retracted position, such that the stand base is positioned substantially flush with at least a portion of the outer surface of the base portion of the portable media player.

10. The portable media player of claim 8, wherein the portable media player comprises a DVD player and wherein the media storage device comprises a DVD.

11. The portable media player of claim 9, wherein the display screen is an LCD display screen.

12. The portable media player of claim 9, comprising a second display screen positioned on a portion of an edge surface area of the outer surface of the base portion of the portable media player.

13. The portable media player of claim 11, wherein the second display screen is an LCD screen.

14. The portable media player of claim 8, wherein the battery is a rechargeable lithium ion battery.

15. A portable DVD player comprising:

a clamshell style base portion having an outer surface and an inner surface, and having an edge surface area and a non-edge surface area;

a clamshell style cover portion, having an outer surface and an inner surface, pivotally connected by a first hinge to the base portion to allow rotational movement of the cover portion with respect to the base portion so as to allow the portable DVD player to be positioned in the closed clamshell position or an opened clamshell position;

wherein the portable DVD player is adapted to allow, in the opened clamshell position, insertion of a DVD onto at least a portion of the inner surface of the base portion, and adapted to allow, in the closed clamshell position, securing of the DVD within the portable DVD player; and wherein at least a portion of the outer surface of the cover portion includes a display screen adapted to allow viewing of video obtained from the DVD while the portable DVD player is in a closed clamshell position; and a stand assembly adapted to be removably attachable to the outer surface of the base portion of the portable DVD player, the stand assembly comprising:

a first portion;

one or more leg members, the one or more leg members being stationary with respect to each other; and a stand base portion including a battery for actuation of the portable DVD player;

wherein the first portion is adapted to be removably attachable to the outer surface of the base portion of the portable DVD player;

wherein the first portion is pivotally attached by a second hinge to first ends of the one or more leg members to allow rotational movement of the leg members with respect to the outer surface of the base portion of the portable DVD player; and wherein the stand base portion is pivotally attached by a third hinge to second ends of the one or more leg members to allow rotational movement of the one or more leg members with respect to the stand base portion.

16. A portable DVD player comprising:

a clamshell style base portion having an outer surface and an inner surface; and having an edge surface area and a non-edge surface area;

a clamshell style cover portion, having an outer surface and an inner surface, pivotally connected by a first hinge to the base portion to allow rotational movement of the cover portion with respect to the base portion so as to allow the portable DVD player to be positioned in the closed clamshell position or an opened clamshell position;

wherein the portable DVD player is adapted to allow, in the opened clamshell position, insertion of a DVD onto at least a portion of the inner surface of the base portion, and adapted to allow, in the closed clamshell position, securing of the DVD within the portable DVD player; and wherein at least a portion of the outer surface of the cover portion includes a display screen adapted to allow viewing of video obtained from the DVD while the portable DVD player is in a closed clamshell position;

a stand member, pivotally connected by a second hinge to the outer surface of the base portion, adapted to allow positioning of the portable DVD player on a first surface such that the portable DVD player is supported on the first surface by contact of at least a portion of the edge surface area of the base portion with the first surface and contact of at least a portion of the stand member with the first surface; and a stand assembly adapted to be removably attachable to the outer surface of the base portion of the portable DVD player, the stand assembly comprising:

a first portion;

one or more leg members, the one or more leg members being stationary with respect to each other; and a stand base portion including a battery for actuation of the portable DVD player;

wherein the first portion is adapted to be removably attachable to the outer surface of the base portion of the portable DVD player;

wherein the first portion is pivotally attached by a third hinge to first ends of the one or more leg members to allow rotational movement of the leg members with respect to the outer surface of the base portion of the portable DVD player; and wherein the stand base portion is pivotally attached by a fourth hinge to second ends of the one or more leg members to allow rotational movement of the one or more leg members with respect to the stand base portion;

wherein the stand member can be positioned in a retracted position such that the stand member is positioned in a recessed area formed in the outer surface of the base portion of the portable DVD player, and wherein the stand assembly is attachable, while the stand member is in a retracted position, such that the stand base is positioned substantially flush with at least a portion of the outer surface of the base portion of the portable DVD player.

* * * * *

UNITED STATES PATENT AND TRADEMARK OFFICE
CERTIFICATE OF CORRECTION

| | |
|---|---|
| PATENT NO. | : 7,398,535 B2 |
| APPLICATION NO. | : 11/009396 |
| DATED | : July 8, 2008 |
| INVENTOR(S) | : Yong De Zhang |

It is certified that error appears in the above-identified patent and that said Letters Patent is hereby corrected as shown below:

In the specification, column 9, line 39, replace "batter" with --battery--

In claim 8, column 12, line 61, replace "section" with --portion--

In claim 9, column 13, line 48, after "base" insert --portion--

In claim 16, column 16, line 14, after "base" insert --portion--

Signed and Sealed this

Seventh Day of April, 2009

JOHN DOLL
*Acting Director of the United States Patent and Trademark Office*